United States Patent
Johnston et al.

(10) Patent No.: US 10,815,758 B2
(45) Date of Patent: Oct. 27, 2020

(54) OILFIELD SERVICE SELECTOR

(71) Applicant: Schlumberger Technology Corporation, Sugar Land, TX (US)

(72) Inventors: Lucian Johnston, Sugar Land, TX (US); Mark Passolt, Hansville, WA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 517 days.

(21) Appl. No.: 14/995,973

(22) Filed: Jan. 14, 2016

(65) Prior Publication Data

US 2016/0208583 A1 Jul. 21, 2016

Related U.S. Application Data

(60) Provisional application No. 62/104,292, filed on Jan. 16, 2015.

(51) Int. Cl.
| | |
|---|---|
| G06Q 30/00 | (2012.01) |
| E21B 41/00 | (2006.01) |
| G06Q 10/10 | (2012.01) |
| E21B 47/00 | (2012.01) |
| G01V 1/30 | (2006.01) |
| G01V 1/40 | (2006.01) |

(52) U.S. Cl.
CPC .......... *E21B 41/0092* (2013.01); *E21B 47/00* (2013.01); *G01V 1/30* (2013.01); *G01V 1/40* (2013.01); *G06Q 10/10* (2013.01)

(58) Field of Classification Search
CPC ....... E21B 47/00; E21B 41/0092; G01V 1/30; G01V 1/40; G06Q 10/10
See application file for complete search history.

(56) References Cited

U.S. PATENT DOCUMENTS

| | | | | |
|---|---|---|---|---|
| 6,980,940 | B1* | 12/2005 | Gurpinar | E21B 43/00 |
| | | | | 703/10 |
| 7,003,515 | B1 | 2/2006 | Glaser et al. | |
| 7,113,917 | B2 | 9/2006 | Jacobi et al. | |
| 8,768,672 | B2* | 7/2014 | Hsu | G01V 1/282 |
| | | | | 703/10 |
| 9,175,547 | B2* | 11/2015 | Vaal | E21B 41/00 |
| 9,957,781 | B2* | 5/2018 | Vennelakanti | E21B 43/00 |
| 2002/0169645 | A1* | 11/2002 | Aronstam | G06Q 10/06 |
| | | | | 702/188 |
| 2008/0109490 | A1* | 5/2008 | Arnegaard | E21B 41/00 |

(Continued)

OTHER PUBLICATIONS

Schlumberger, Brochure: OptiDrill Realtime drilling intelligence service, Oct. 2014, http://www.slb.com/~/media/Files/drilling/brochures/mwd/optidrill_br.pdf, 9 pages.

(Continued)

*Primary Examiner* — Mila Airapetian
(74) *Attorney, Agent, or Firm* — Alec J. McGinn

(57) ABSTRACT

A method can include receiving information associated with an oilfield service; analyzing at least a portion of the information based at least in part on an oilfield services database that includes individual data structures that characterize individual oilfield services; and, based at least in part on the analyzing, outputting at least one additional oilfield service as a recommended oilfield service.

19 Claims, 14 Drawing Sheets

(56) References Cited

U.S. PATENT DOCUMENTS

| | | | |
|---|---|---|---|
| 2011/0022435 A1* | 1/2011 | Reid | G06F 8/30 |
| | | | 705/7.27 |
| 2011/0031015 A1* | 2/2011 | Downton | E21B 47/12 |
| | | | 175/27 |
| 2011/0153300 A1* | 6/2011 | Holl | E21B 47/022 |
| | | | 703/10 |
| 2014/0182841 A1 | 7/2014 | Lecerf et al. | |
| 2014/0262246 A1 | 9/2014 | Li et al. | |

OTHER PUBLICATIONS

International Search Report and Written Opinion issued in related PCT application PCT/US2016/013512 dated May 25, 2016, 15 pages.

* cited by examiner

OILFIELD SERVICE SELECTOR

RELATED APPLICATIONS

This application claims the benefit of and priority to a U.S. Provisional Application having Ser. No. 62/104,292, filed 16 Jan. 2015, which is incorporated by reference herein.

BACKGROUND

An oilfield can be a geologic environment that includes hydrocarbons, whether as liquids, gases or other states. An oilfield can include one or more reservoirs that include hydrocarbons. To develop an oilfield for production of hydrocarbons various services may be performed. For example, consider survey services, which can include seismic survey services where seismic data are acquired and analyzed via a seismic analysis framework. As an example, some services may be model-based. A model can be a single or multi-dimensional model of at least a portion of a geologic environment. Such a model may be, for example, utilized to simulate one or more physical phenomena. As an example, some services may rig-based. As an example, a rig can be a system of components where services can include operating the rig to form a bore in a geologic environment, to transport equipment into and out of a bore in a geologic environment, etc. As an example, a rig may be a system that can be operated to drill a wellbore and to acquire information about a geologic environment, drilling, etc. As an example, a rig can include components such as one or more of a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform.

SUMMARY

A method can include receiving information associated with an oilfield service; analyzing at least a portion of the information based at least in part on an oilfield services database that includes individual data structures that characterize individual oilfield services; and, based at least in part on the analyzing, outputting at least one additional oilfield service as a recommended oilfield service. A system can include a processor; memory operatively coupled to the processor; a network interface operatively coupled to the processor; and instructions stored in the memory and executable by the processor to instruct the system to: receive information associated with an oilfield service; analyze at least a portion of the information based at least in part on an oilfield services database that includes individual data structures that characterize individual oilfield services; and, based at least in part on an analysis of at least a portion of the information based at least in part on an oilfield services database that includes individual data structures that characterize individual oilfield services, output at least one additional oilfield service as a recommended oilfield service. One or more computer-readable storage media can include processor-executable instructions executable to instruct a computer to: receive information associated with an oilfield service; analyze at least a portion of the information based at least in part on an oilfield services database that includes individual data structures that characterize individual oilfield services; and, based at least in part on an analysis of at least a portion of the information based at least in part on an oilfield services database that includes individual data structures that characterize individual oilfield services, output at least one additional oilfield service as a recommended oilfield service. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
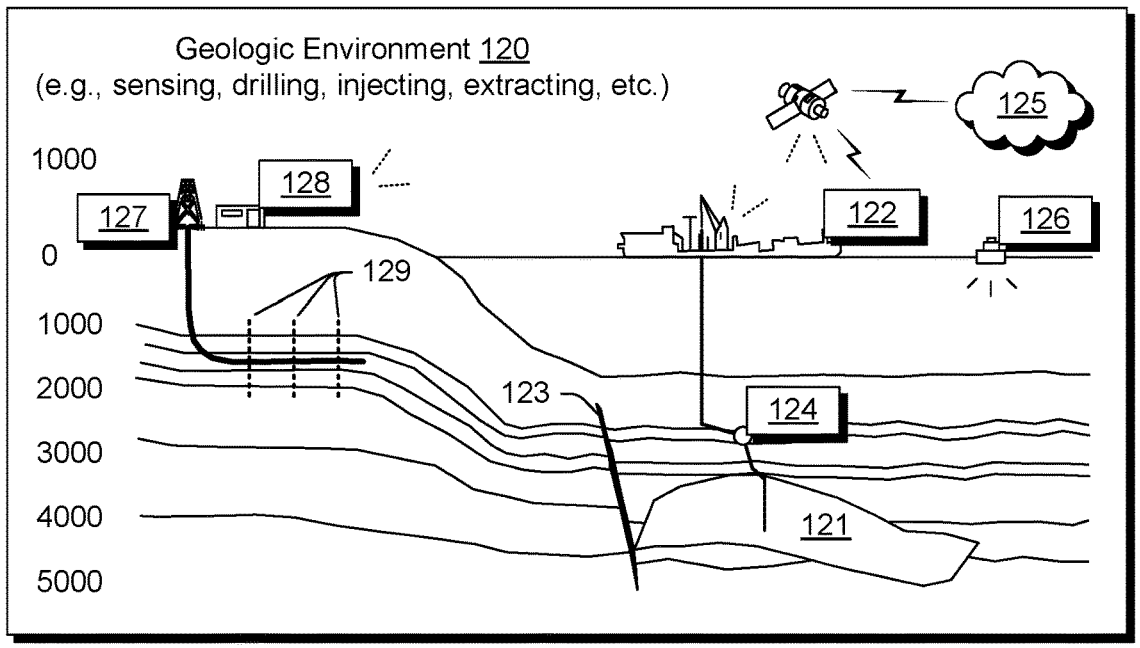
FIG. 1 illustrates examples of equipment in a geologic environment.
Figure 1:
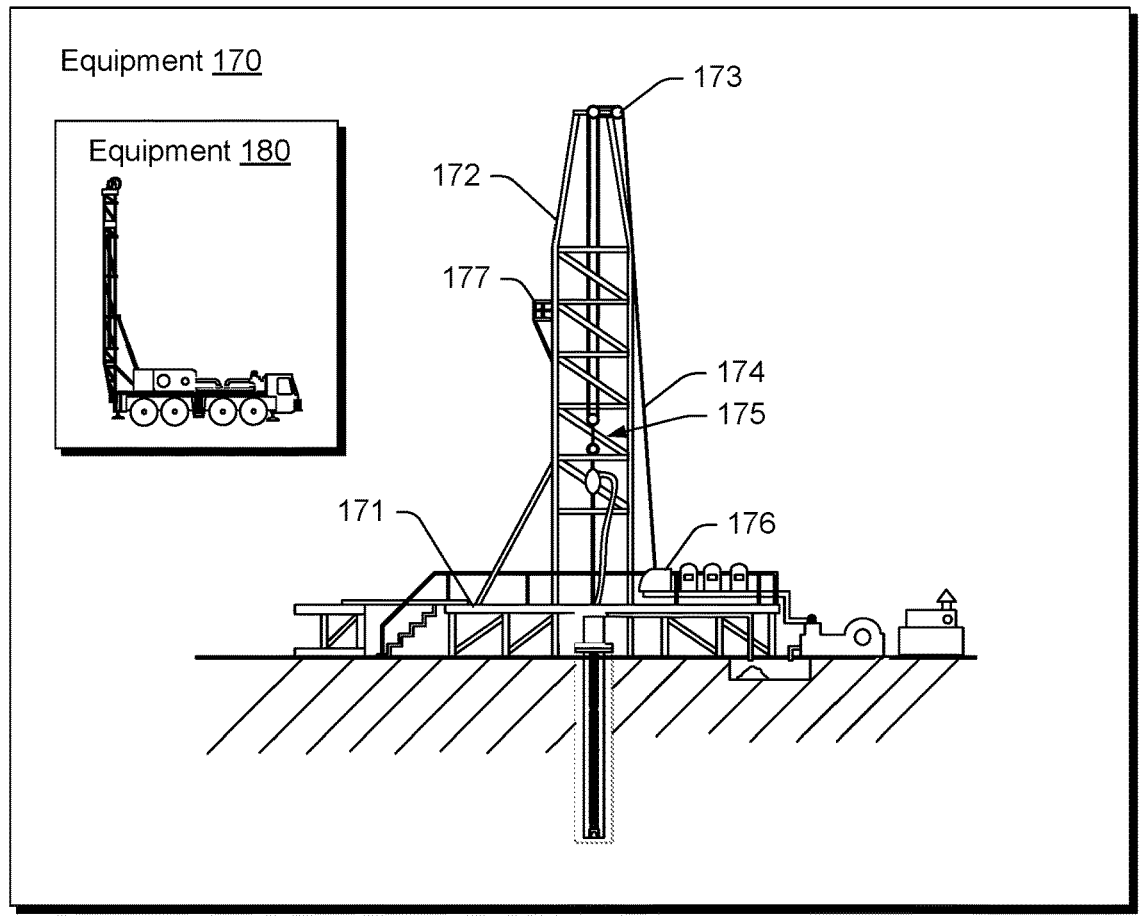

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
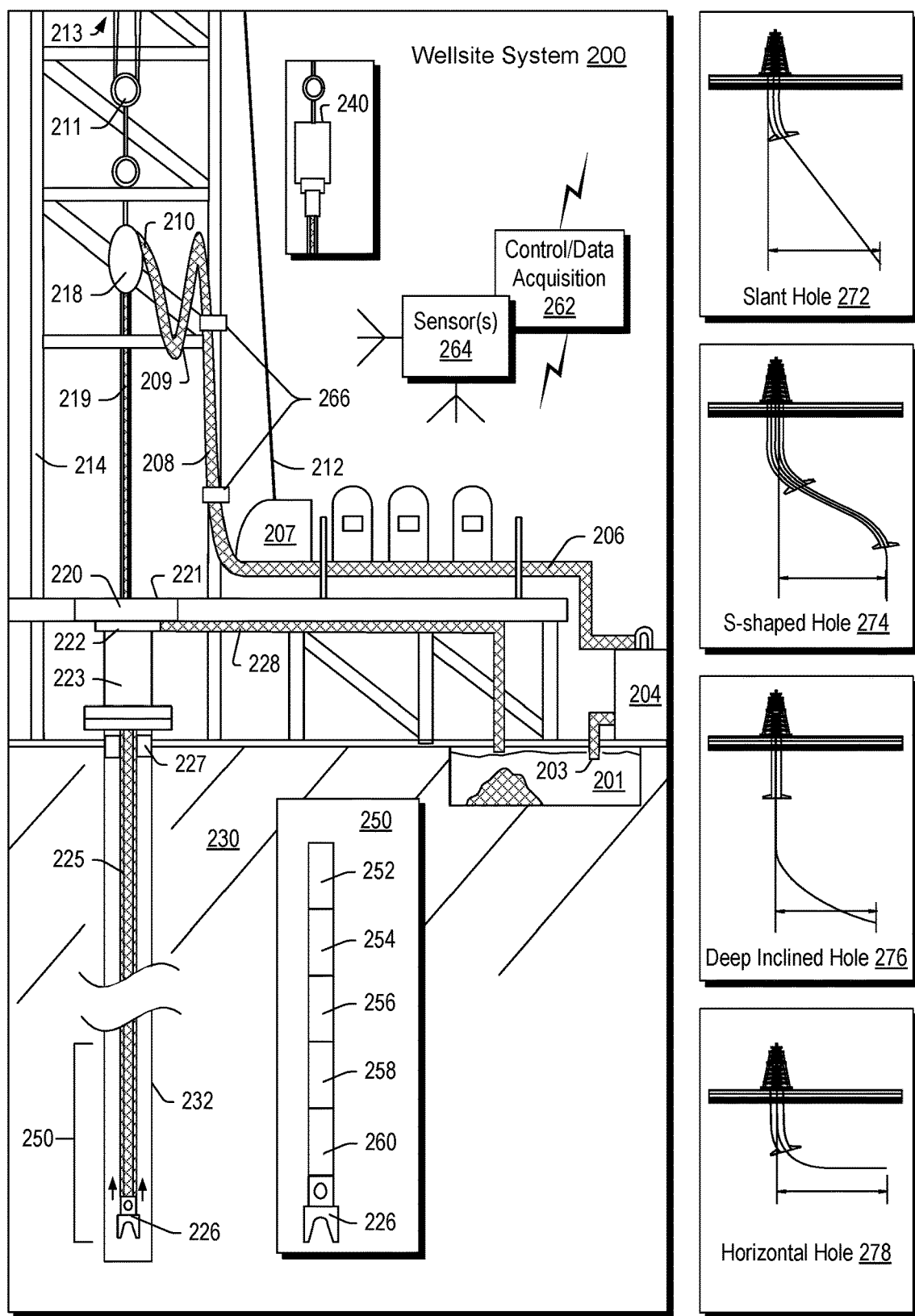
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material, a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 system can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turns the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be done with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
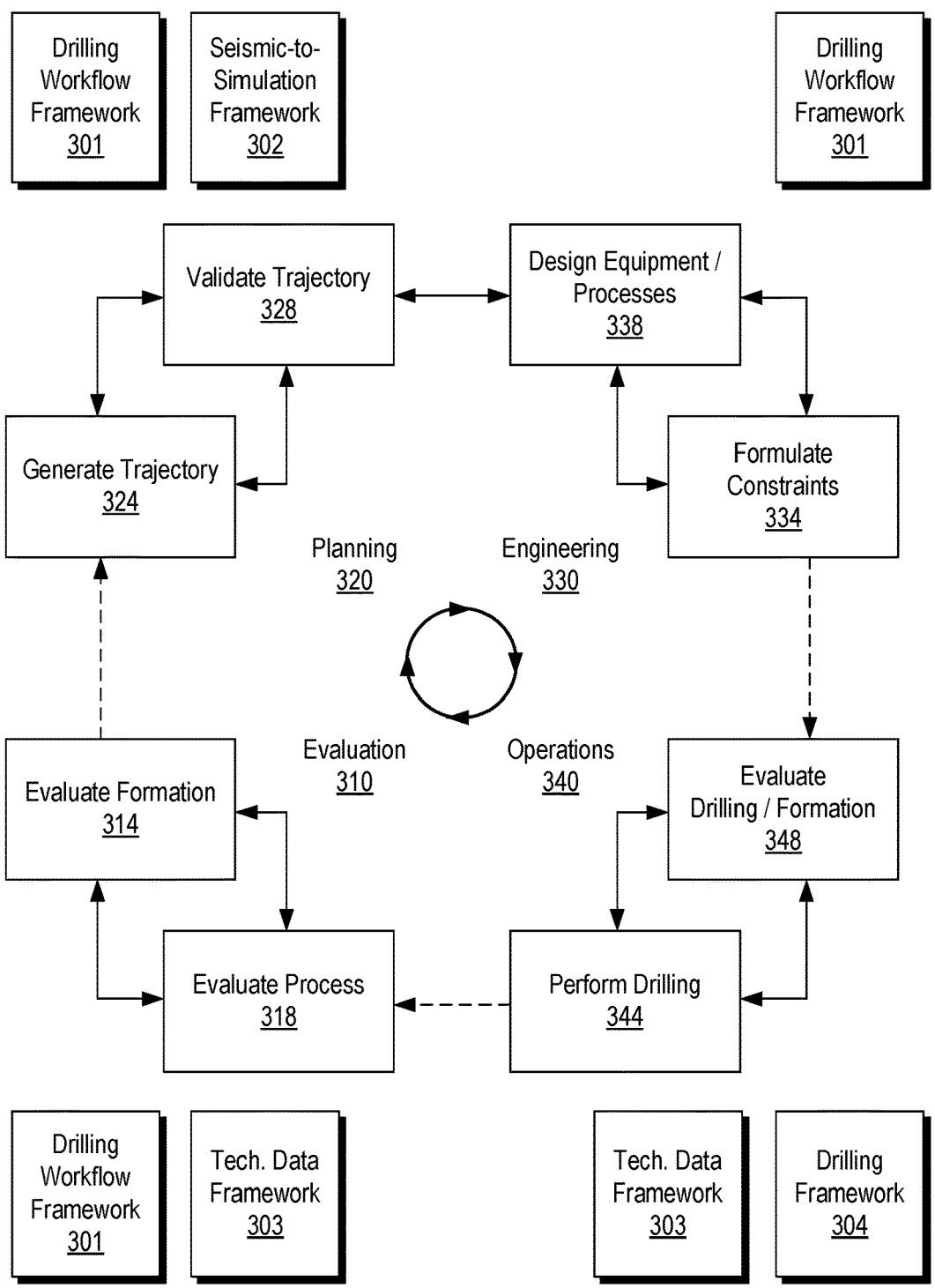
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 302 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc. As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
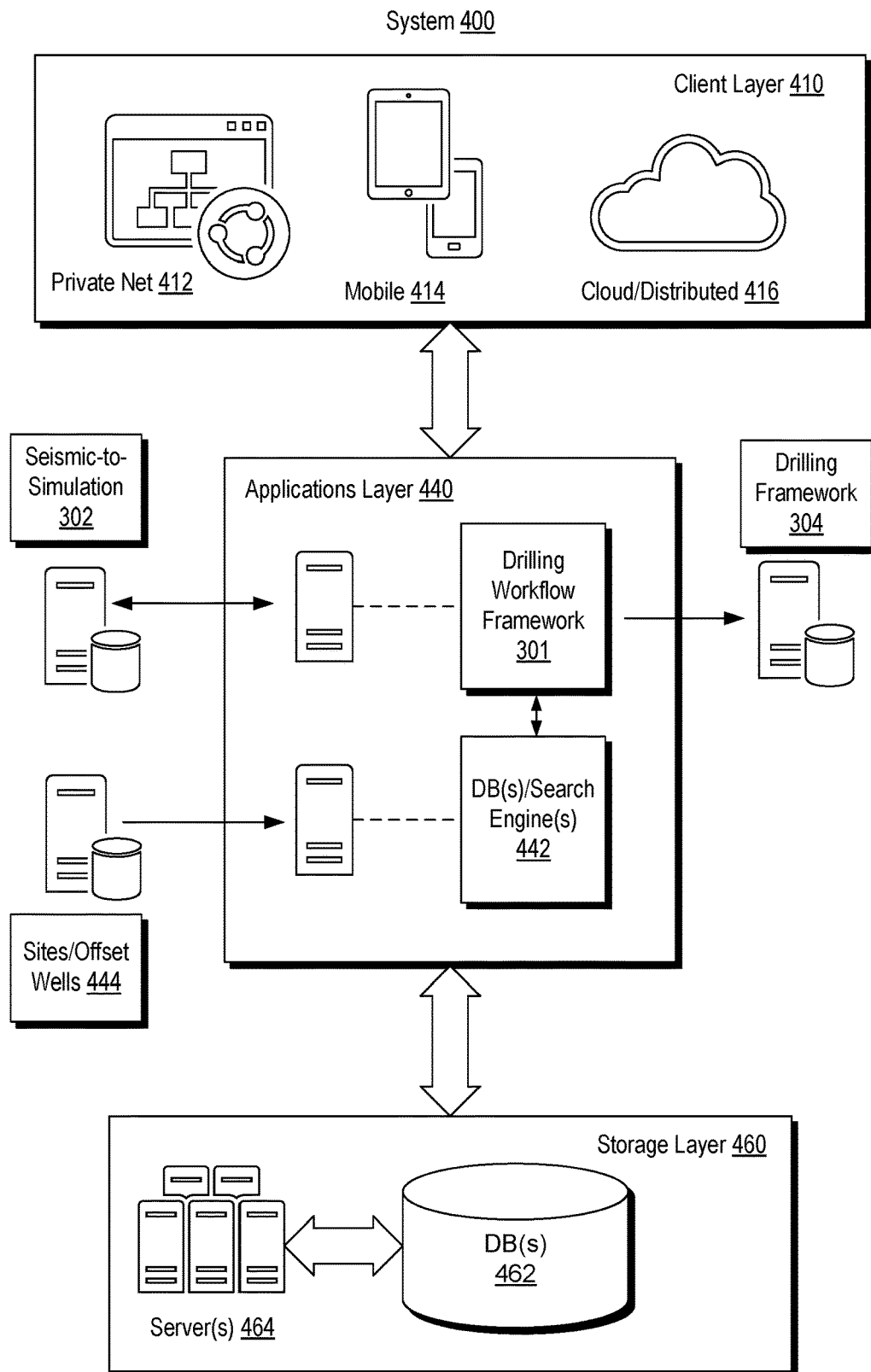
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

Figure 5:
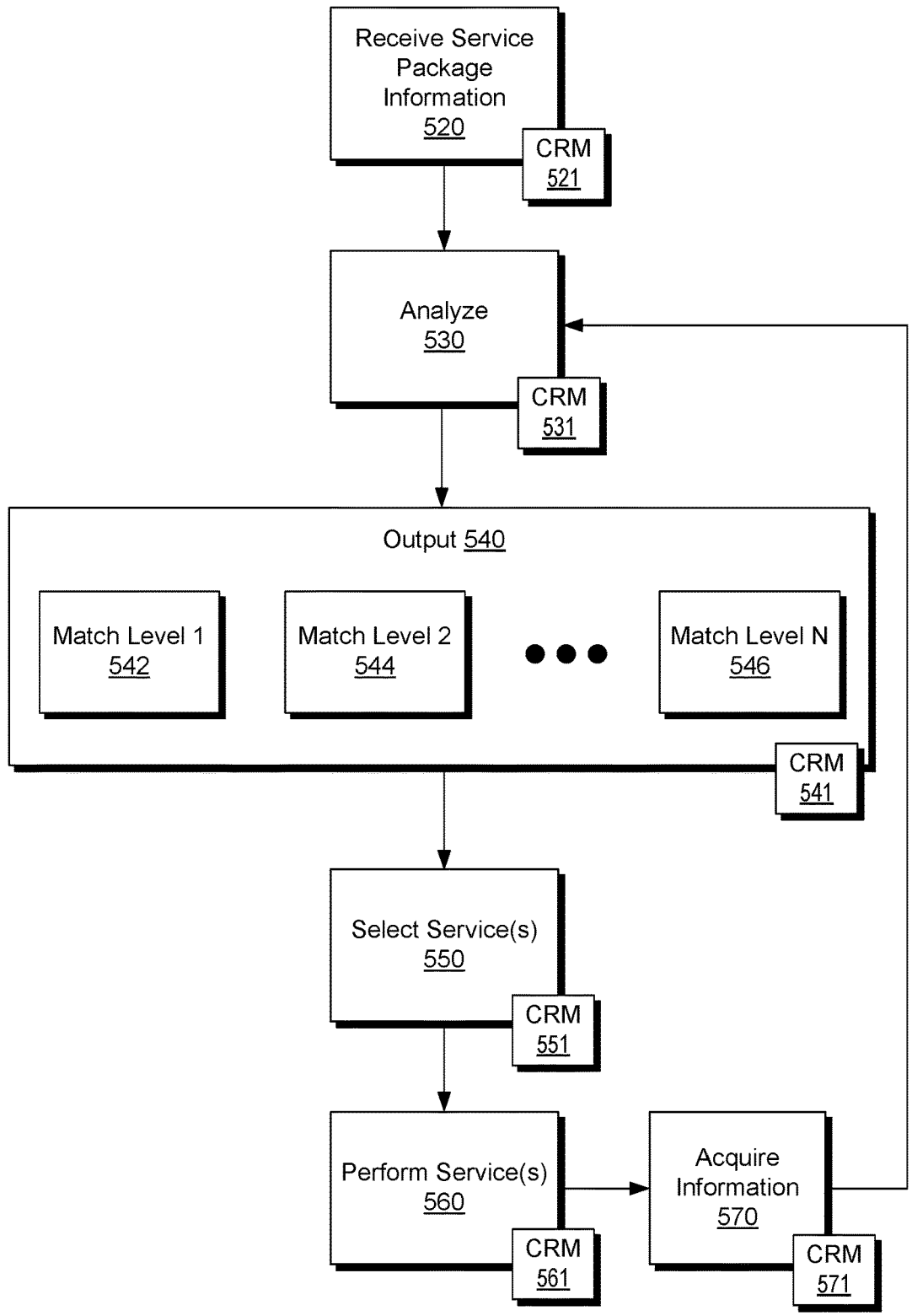
FIG. 5 illustrates an example of a method.

FIG. 5 shows an example of a method 510 that includes a reception block 520 for receiving service package information, an analysis block 530 for analyzing at least a portion of the service package information, an output block 540 for outputting one or more matching services based at least in part on the analyzing of the analysis block 530, a selection block 550 for selecting one or more of the output services, a performance block 560 for performing at least one of the selected one or more services, and an acquisition block 570 for acquiring information associated with the performing of the performance block 560. As shown in the example of FIG. 5, at least a portion of the information of the information block 570 may be received by the analysis block 530 such that a loop can be formed, which may be iteratively operated to revise output of the output block 540 for a particular field site or sites.

In the example of FIG. 5, the output block 540 can include one or more outputs that correspond to particular levels. For example, consider a match level 1 per a block 542, a match level 2 per a block 544 to a match level N per a block 546. As an example, the analysis block 530 may operate based at least in part on criteria that correspond to a match level or match levels. In such an example, services may be sorted, which may facilitate selection per the selection block 550.

The method 510 is shown in FIG. 5 in association with various computer-readable media (CRM) blocks 521, 531, 541, 551, 561 and 571. Such blocks generally include instructions suitable for execution by one or more processors (or cores) to instruct a computing device or system to perform one or more actions. While various blocks are shown, a single medium may be configured with instructions to allow for, at least in part, performance of various actions of the method 510. As an example, a computer-readable medium (CRM) may be a computer-readable storage medium. As an example, the blocks 521, 531, 541, 551, 561 and 571 may be provided as one or more modules, for example, such as the one or more modules and/or instructions 1302 of the system 1300 of FIG. 13.

As an example, a method can include identifying service opportunities and, for example, generating one or more proposals to provide at least one service.

As an example, a customer may issue multiple Requests for Proposal (RFPs) to a vendor, possibly going to different people and/or organizations within a vendor's organization. As an example, in various instances, one or more RFPs might cover a portion of services offered by a particular vendor. As a supplement to one or more other systems and procedures for managing and responding to RFPs, an example system can include an Opportunity Identification System (OIS) and a Gap Filling System (GFS) that can be implemented to generate one or more proposals for services (e.g., additional services), which, for example, may not have been specifically requested by a customer. As an example, a system may provide output that may confirm suitability of proposed services, recommend one or more services in addition to the proposed services and/or recommend one or more services as alternatives to one or more of the proposed services.

As an example, a customer can issue one or more RFPs to a vendor, where, for example, one or more RFPs can be associated with a common "Customer Activity". In such an example, the RFPs may originate from one or more people and/or organizations within the customer's organization. The RFPs may be issued to one or more people and/or organizations within the vendor's organization. As an example, in various instances, neither the customer originators nor the vendor recipients might realize that the RFPs are related.

As an example, upon receiving RFPs, vendor recipients can enter them into a Proposal Management System (PMS). As an example, a PMS can enable one or more users to group at least some received RFPs, for example, with the grouping corresponding to an instigating Customer Activity, thereby adding information that may have been obscured in the RFP issuance process.

As an example, for one or more individual RFPs, one or more work items can be created in a Work Management System (WMS). In such an example, one or more individual work items can produce one or more of service proposals that aim to fulfill one or more RFPs. Such services can be referred to as "Requested Services".

As an example, a vendor organization can offer more services than are in received Requested Services. For example, in the case where RFPs are issued to, and the services are provided by distinct entities within a vendor's organization, where, for example, neither the customer nor the vendor may readily recognize that there are opportunities to propose additional services corresponding to the Customer Activity.

As an example, an Opportunity Identification System (OIS) may examine one or more RFPs in a PMS and work items in a WMS and compare the Requested Services with a vendor's Service Catalog (SC). In such an example, the OIS can identify one or more services that are in the Service Catalog and that are relevant to the Customer Activity (e.g., which may not be in the Requested Services). In such an approach, these one or more services can be referred to as "Candidate Services".

As an example, a Gap Filling System (GFS) can examine the Candidate Services and select zero or more of the services to complement Requested Services and thereby form a more complete set of services related to Customer Activity that can be provided by a vendor. Such services, collectively, can be referred to as "Additional Services". As an example, a GFS may operate using, for example, "genes"

and one or more algorithms that can process information carried with the genes or otherwise associated with the genes. As an example, a service may be characterized by one or more genes. As an example, a GFS may act to form one or more bundles of services based at least in part on an analysis that includes analyzing, matching, etc. genes (e.g., genetic information that can characterize one or more services).

As an example, entries may be recorded in a PMS corresponding to Additional Services and associated with Customer Activity. Work Items may be created in a WMS corresponding to new PMS entries.

As an example, a Service Proposal Design System (SPDS) can create one or more proposals for Requested Services and Additional Services. In such an example, the Additional Services may be designed as a supplement to the Requested Services. As an example, proposals for Requested Services may be designed without regard to Additional Services. As an example, Additional Services may be designed to be consistent with proposed Requested Services, which may be referred to as "Supplemental Service Proposals".

As an example, Additional Services and Requested Services may be designed together. As an example, design of Requested Services may be different if Additional Services are ignored. In such an example, a potential exists for a combined set of proposed services to provide a better solution than by treating the Additional Services as supplemental. In such an example, the combination can be referred to as "Optimized Service Proposals".

As an example, a PMS may produce one or more proposals in response to receipt of one or more RFPs, and a proposal can include one or more component service proposals.

As an example, service proposals may be tiered, for example, as levels such as levels that include a Basic Services Proposal level, a Supplemental Services Proposal level and an Optimized Services Proposal level.

Basic Services Proposal: This level may cover services directly attributable to one or more issued RFPs.

Supplemental Services Proposal: This level may cover one or more additional services.

Optimized Services Proposal: This level may cover Requested Services and one or more Additional Services, for example, designed together to provide an overall comprehensive solution.

As an example, an Optimized Services Proposal can include information indicating the way in which it is a better solution than, for example, a Basic Services Proposal or a combination of a Basic Services Proposal and services from a Supplemental Services Proposal.

As an example, a system may be embodied in a variety of ways and not necessarily embodied in similar ways and one or more embodiments may vary across a vendor's organization. For example, a PMS might be implemented as a list of RFPs on a whiteboard or may be implemented in a computer program. As an example, in various systems, where implemented at least in part as a computer program, there may be aspects that are combined, integrated in a single larger system or, for example, various aspects may exist as loosely coupled programs.

As an example, a method can include interfacing with a Pricing System. In such an example, this can allow a vendor to incorporate pricing information in one or more service proposals.

As an example, a method can be used in an anticipatory fashion in a situation where the customer has not issued a RFP or RFPs. For example, based on knowledge of the market or publically available data such as a filing with a government agency to declare the intention to drill a well, the vendor might implement one or more methods to create one or more service proposals.

Figure 6:
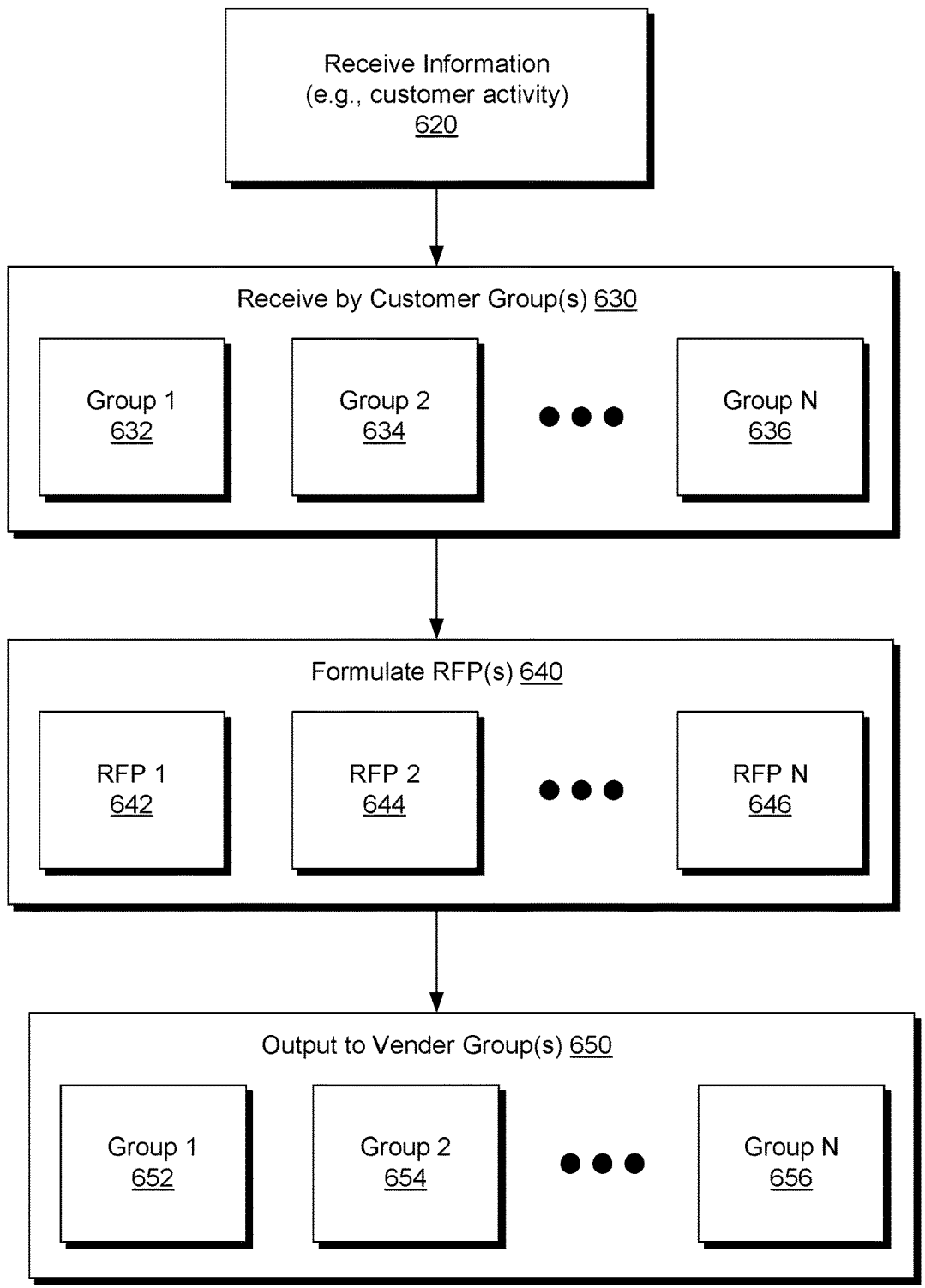
FIG. 6 illustrates an example of a method.

FIG. 6 shows an example of a method 610 that includes a reception block 620 for receiving information (e.g., customer activity, etc.), a reception block 630 for receiving at least a portion of the information by one or more groups (e.g., group 1 per block 632, group 2 per block 634 to group N per block 636), a formulation block 640 for formulating one or more RFPs (e.g., RFP 1 per block 642, RFP 2 per block 644 to RFP N per block 646), and an output block 650 for outputting one or more formulated RFPs to one or more vendor groups (e.g., group 1 per block 652, group 2 per block 654 to group N per block 656).

Figure 7:
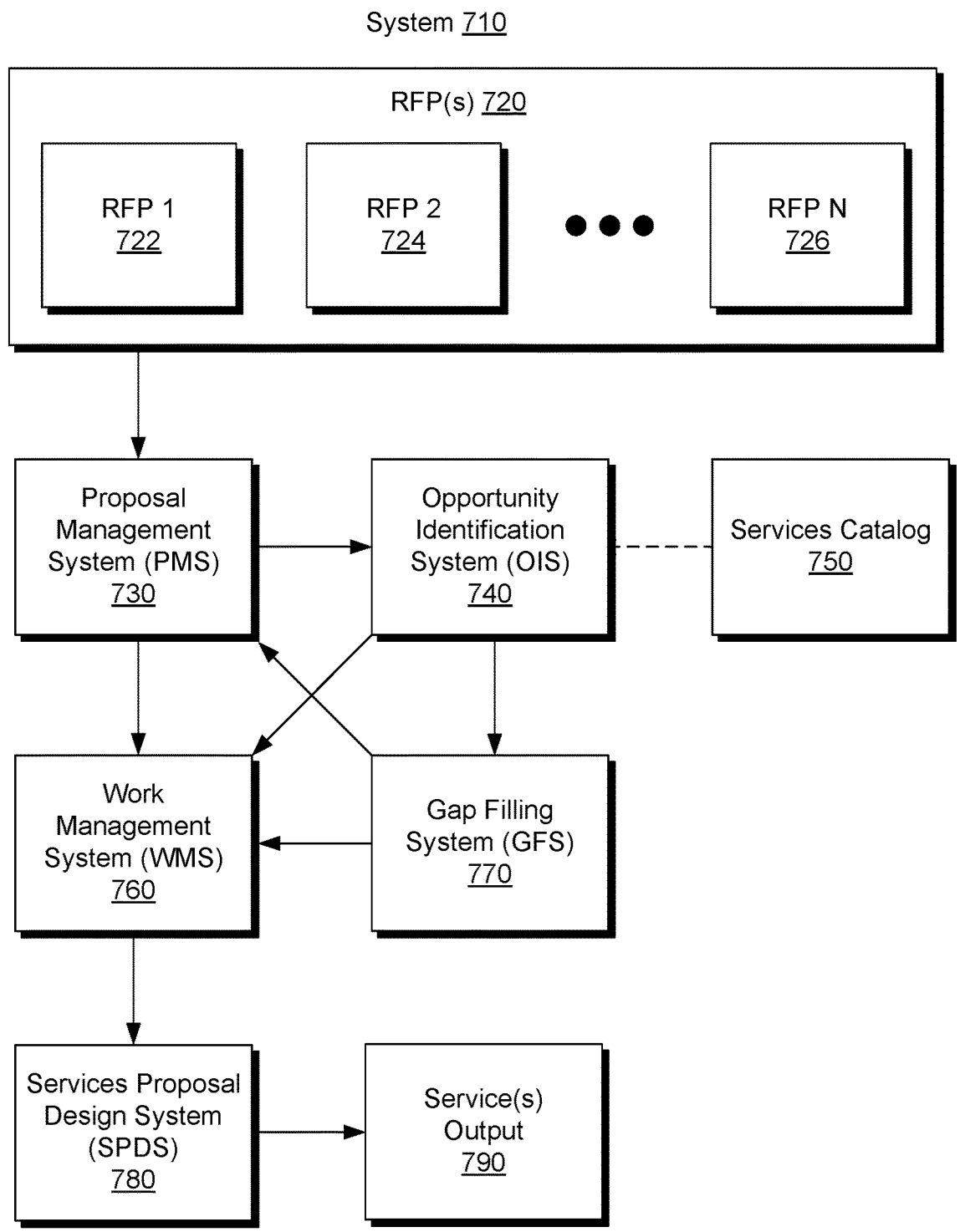
FIG. 7 illustrates an example of a system.

FIG. 7 shows an example of a system 710 that includes an RFP interface and/or repository 720 for one or more RFPs 722, 724 and 726, a Proposal Management System (PMS) 730, an Opportunity Identification System (OIS) 740, a Services Catalog 750, a Work Management System (WMS) 760, a Gap Filling System (GFS) 770 and a Services Proposal Design System (SPDS) 780. As shown, the system 710 can process information as to the one or more RFPs 722, 724 and 726 to output one or more services per the service(s) output block 790.

As an example, consider proposing drilling services associated with an oilfield. In such an example, a customer plans to drill an oil well (e.g., Customer Activity). To support such activity, the customer issues multiple RFPs to one or more departments in a vendor organization for them to propose drilling services. As an example, the RFPs may include certain information for the vendor to create service proposals.

As an example, the following actions may be performed: The Drilling Department may issue an RFP for directional drilling services to the vendor's Drilling Engineering Department; The Well Control Department may issue an RFP for drilling fluid services to the vendor's Mud Services Department; When received, the RFPs may be entered into the PMS and work items may be created in the WMS.

In the foregoing example, consider a scenario where the Drilling Department RFP results in work items to generate proposals for multiple services where such services can include BHA Services and Trajectory Services.

In the foregoing example, consider a scenario where the Well Control RFP results in a single service proposal for Drilling Fluid Services.

In the foregoing example, an OIS can examine the Requested Services and the Service Catalog where it can identify that the vendor offers services not included in the Requested Services. For example, consider identification of the following services: Drill Bit Services, Geo-steering Services and Seismic Interpretation Services. In such an example, the first two services may be consistent with the Customer Activity of drilling an oil well and may be referred to as Candidate Services. As an example, one or more algorithms may be implemented by a system for identification.

As an example, a GFS can examine RFPs and Candidate Services. For example, while a geo-steering service may be consistent with drilling an oil well, the subject well may be a vertical well and geo-steering services might not be relevant. As an example, a Drill Bit Service might be selected as an Additional Service without selection of Geo-steering Services.

As an example, a record may be made in a PMS corresponding to a selected service, for example, the Drill Bit Service mentioned in the foregoing example. In such an example, a work item may be created in a WMS to create a Drill Bit Services Proposal. As an example, a WMS may use an automatic bit specification capability to create a Drill Bit Service Proposal.

As an example, a PMS may produce different levels of proposals such as, for example:

Basic Services Proposal: BHA Services and Trajectory Services

Supplemental Services Proposal: Drill Bit Service

Optimized Services Proposal: BHA Services, Trajectory Services and Drill Bit Service As an example, details of services provided in an Optimized Services Proposal may be different than details of corresponding services in a Basic Services Proposal and/or a Supplemental Services Proposal.

As an example, a recommendation system may be implemented for making recommendations. For example, the analysis block 530 of the method 510 of FIG. 5 may include implementing a recommendation system to generate output of the output block 540.

As an example, a recommendation system can include one or more of Collaborative Filtering and Content-based Filtering. Such approach can use information from or about the user, or other users, to make a recommendation at the user's (possibly unexpressed) request.

For example, a recommendation system can recommend a service based on other services the customer has bought. As another example, a recommendation service can recommend a service or services based on similarity to a service or services specified by the user.

As an example, a system can be implemented to generate Additional Services, which may be of a different type than requested by a customer. In such an example, the Additional Services can be designed to be compatible with Requested Services. As an example, Customer Activity, such as drilling an oil well, may be known, specific and it may be determined what services could be involved to perform the activity. In such an example, a recommendation system can propose one or more services that are relevant to the Customer Activity.

As an example, a system may include a cross-selling algorithm that is executable by one or more processors (e.g., via execution of processor-executable instructions, etc.). As an example, a cross-selling system can focus on making decisions as to whether a product/service can be cross-sold or, more specifically, which products/services can be cross-sold.

As an example, a cross-selling system can provide for determining whether a product and/or service is amenable to cross-selling and at what time, place, entity, etc. a cross-selling proposal can be made.

As an example, a system can make a choice of Additional Services, which may be based at least in part on context of instigating Customer Activity and one or more RFPs. As an example, choice and design of one or more additional services can be based on an RFP or RFPs, for example, to provide a richer solution than requested, but still within a context of Customer Activity.

As an example, a method can include providing for design of a specific proposal, consistent with one or more related RFPs. As an example, a method can include creating an optimized set of service proposals.

Figure 8:
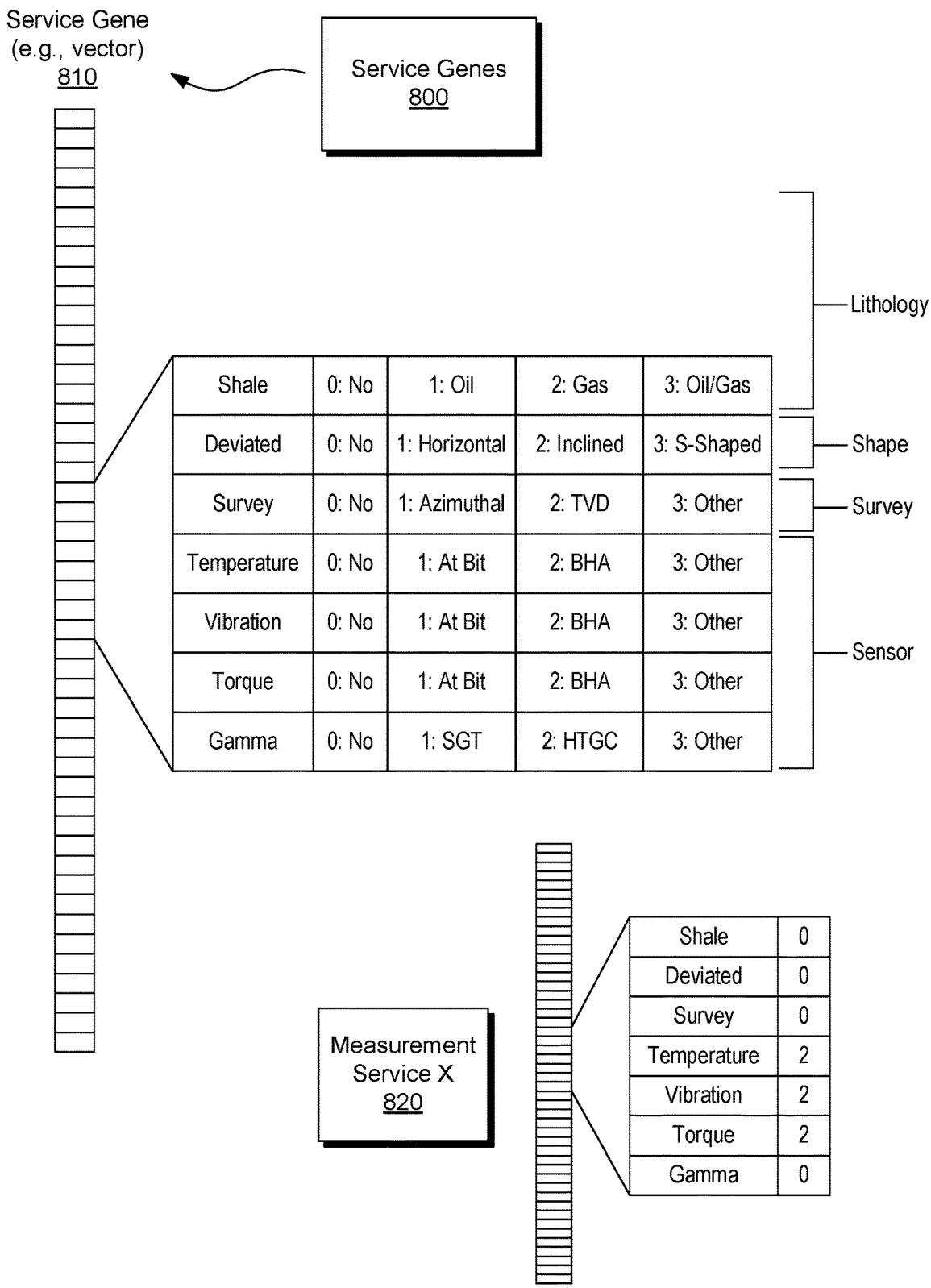
FIG. 8 illustrates an example of a service genes.

FIG. 8 shows an example of a "genetic" approach to classifying services and to recommending services, which can include matching one or more services to information associated with one or more other services (see, e.g., GFS, etc.).

As shown in the example of FIG. 8, service genes 800 may be defined where, for example, a service can be characterized at least in part via a service gene 810, which may be a vector. As an example, a service gene can include portions that pertain to categories of services. For example, consider a lithology portion, a shape of bore portion, a survey portion and a sensor portion. As an example, a particular entry of a service gene can be coded with a numeric code where the numeric code corresponds to information that may define a service. For example, a shale entry of a lithology portion of a service gene may be assigned a value of 0, 1, 2 or 3 where the value indicates information about a service.

As shown in the example of FIG. 8, a measurement service can include values for entries of a corresponding service gene that indicate sensor presence and/or sensor location. For example, consider Measurement Service X 820, which includes a temperature sensor in a bottom hole assembly (BHA), a vibration sensor in a bottom hole assembly (BHA) and a torque sensor in a bottom hole assembly (BHA). These sensors may be part of a component that includes such sensors where that component can be positioned in a drillstring at a position in a BHA, at a distance above a bit. Such sensors may be related to a particular service, which may be in part provided by software.

Figure 9:
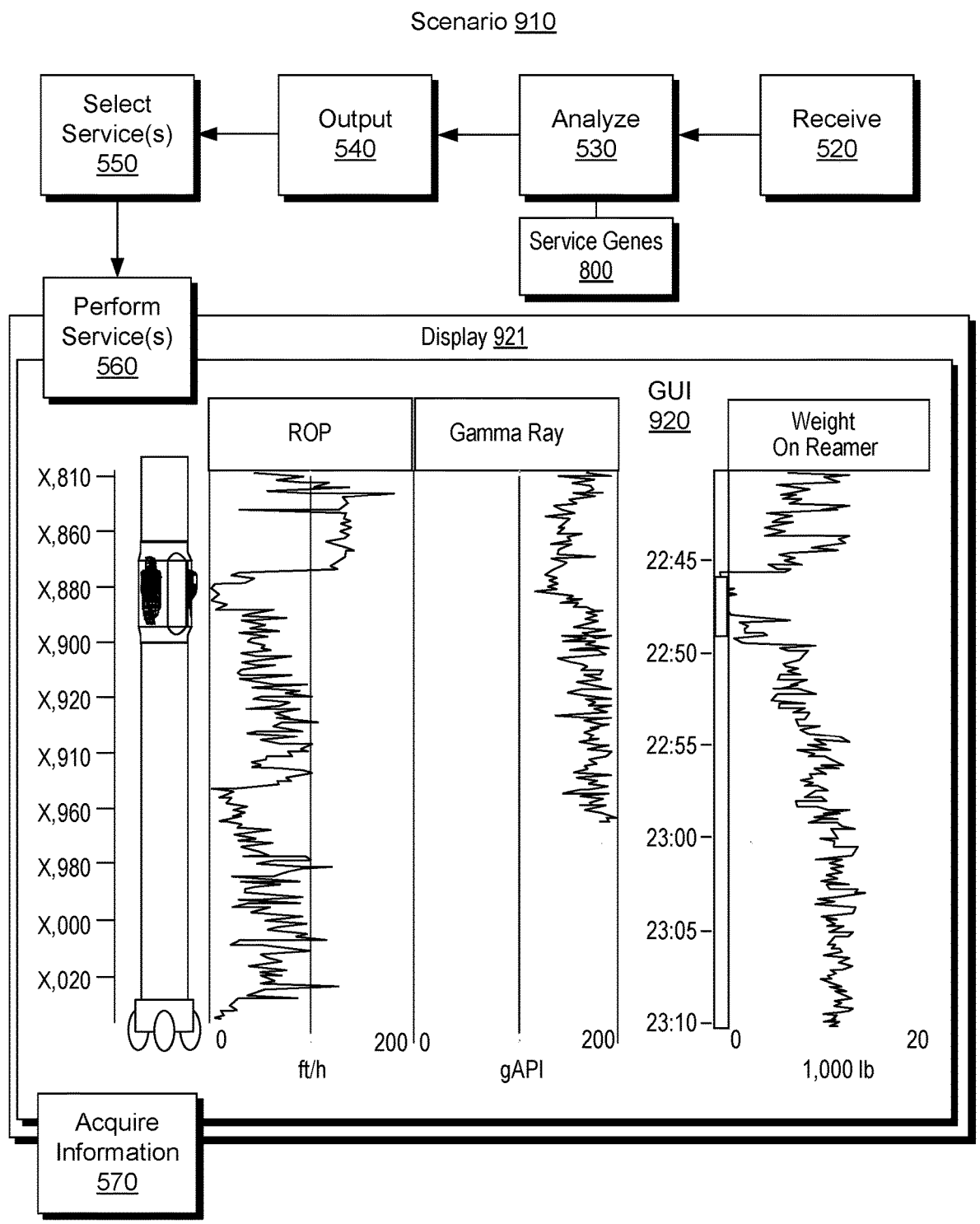
FIG. 9 illustrates an example of a scenario.

FIG. 9 shows an example scenario 910 that includes implementing at least a portion of the method 510 of FIG. 5, for example, using an approach such as the service gene approach of the example of FIG. 8. For example, the analysis block 530 can include accessing service genes 800. In such an example, the information received via the reception block 520 can be utilized to access one or more service genes and to perform an analysis that generates a match or matches with one or more other service genes. In such an example, the analysis block 530 can include parsing service genes as to one or more regions (e.g., lithology, shape, survey, sensor, etc.) and performing matching on a region by region basis. Such an approach may act to filter out particular service genes (e.g., services) that are unlikely to be beneficial to a service or services of the received information per the reception block 520. As an example, the analysis block 530 can include matching on a region by region basis and/or via combinations of regions. For example, consider identifying a lithology value of a service gene that indicates a service is for shale gas and matching that service to a service that includes a sensor that can measure one or more physical phenomena associated with structure of shale (e.g., porosity, composition, etc.).

In the example scenario 910 of FIG. 9, the output block 540 can include outputting a gamma ray service associated with a sensor of a component that can be included in a drillstring (e.g., BHA). As shown, the output service (e.g., a recommended service) can be selected per the selection block 550 and performed per the performance block 560. The selected service may be associated with a framework such as a data acquisition and analysis framework that can render information visually to a graphical user interface (GUI) of a display operatively coupled to a computing device, computing system, etc. For example, consider the OPTIDRILL™ service and associated framework (Schlumberger Limited, Houston, Tex.).

As illustrated in FIG. 9, a GUI 920 is rendered to a display 921 where the GUI 920 includes panels for display of information associated with a drilling operation. Included in the panels are information for rate of penetration (ROP), weight on reamer and gamma ray log information. As an example, where the gamma ray service is selected and performed, the GUI 920 can be adapted to render acquired information to a display.

As an example, per the acquisition block 570, a system can include acquiring information that may be germane to how the selected service benefited one or more drilling operations. For example, metrics may exist that demonstrate that the ROP was beneficially enhanced, that stuck pipe incidents were reduced, that weight on reamer was acceptable, etc. As an example, such information may be utilized by the analysis block 530. For example, where benefits are demonstrated by inclusion of a selected service, a weight may be adjusted that acts to place that service into a particular level. For example, a highly recommended level may exist where demonstrated success of a particular service, when performed with one or more other services, causes that particular service to be weighted favorably for inclusion in that highly recommended level where a customer requests the one or more other services.

As an example, a computer implemented method can include determining at least one match service that corresponds to a source service, where the method can include accessing a database that includes multiple services where individual services are represented by data structures (e.g., n-dimensional database vectors corresponding to n characteristics of services); determining a source service data structure that corresponds to characteristics of the source service; and calculating a metric (e.g., a distance, etc.) for source service and a first database service data structure, the metric being a function of the differences between characteristics of the source service and the first database service. In such an example, calculating can include applying one or more weighting factors. As an example, the foregoing method can include repeating the process for one or more database services and, for example, generating matches, which may be ranked. As an example, a method can include selecting the at least one match service based on the value of a calculated metric or metrics.

As an example, a method can include recommending services in a database of services where the method includes maintaining service selection histories as may be selected from a catalog or catalogs of services. In such an example, the method can include analyzing at least the service selection histories (e.g., collectively of one or more customers), which can be collected over a period of time. In such an example, the method can include calculating data values that represent degrees to which specific services in the catalog or catalogs are related. In such an example, the method can include storing a selected subset of the plurality of data values in a mapping structure that maps services to related services; and, for example, using the mapping structure, including the data values associated therewith, to generate customer-specific recommendations of services within the catalog or catalogs.

Figure 10:
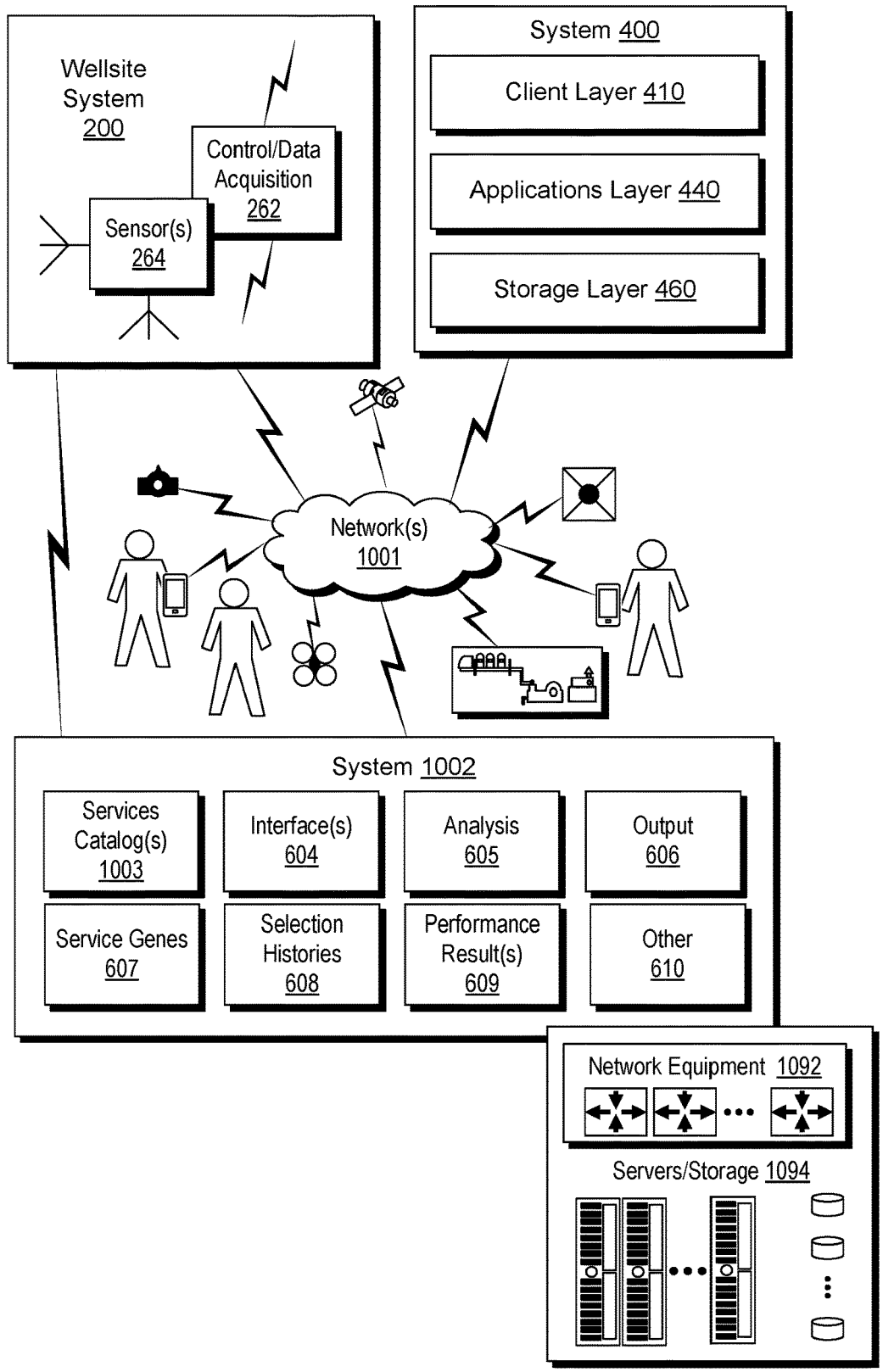
FIG. 10 illustrates an example of an architecture and examples of systems.

FIG. 10 shows an example of an architecture 1000 that can include the wellsite system 200, the system 400 and a system 1002 where the systems 200, 400 and 1002 may be operatively coupled via one or more networks 1001. As an example, the system 1002 may be implemented in part via one or more pieces of equipment such as, for example, one or more pieces of computing equipment. As an example, the system 1002 can include network equipment 1092 and one or more servers and storage devices 1094.

In the example of FIG. 10, the system 1002 can include a services catalog(s) module 1003, an interface(s) module 1004, an analysis module 1005, an output module 1006, a service genes module 1007, a selection histories module 1008, a performance result(s) module 1009 and/or one or more other modules 1010. As an example, the system 1002 can be implemented to receive information from one or more of a service request system, a wellsite system, etc. As an example, the system 1002 can be part of a wellsite system and/or implemented at least in part at a wellsite as part of a wellsite system.

As an example, a service can be or include one or more of OPTIDRILL™, OPTILOG™ and/or other services marketed by Schlumberger Limited, Houston, Tex.

The OPTIDRILL™ technology can help to manage downhole conditions and BHA dynamics as a real-time drilling intelligence service. The service can incorporate a rigsite display of integrated downhole and surface data that provides actionable information to mitigate risk and increase efficiency. Such data can be simultaneously interpreted by remote experts, who may collaborate with a drilling team to improve performance.

The OPTILOG™ technology can help to evaluate drilling system performance with single- or multiple-location measurements of drilling dynamics and internal temperature from a recorder. As an example, post-run data can be analyzed to provide input for future well planning.

Figure 11:
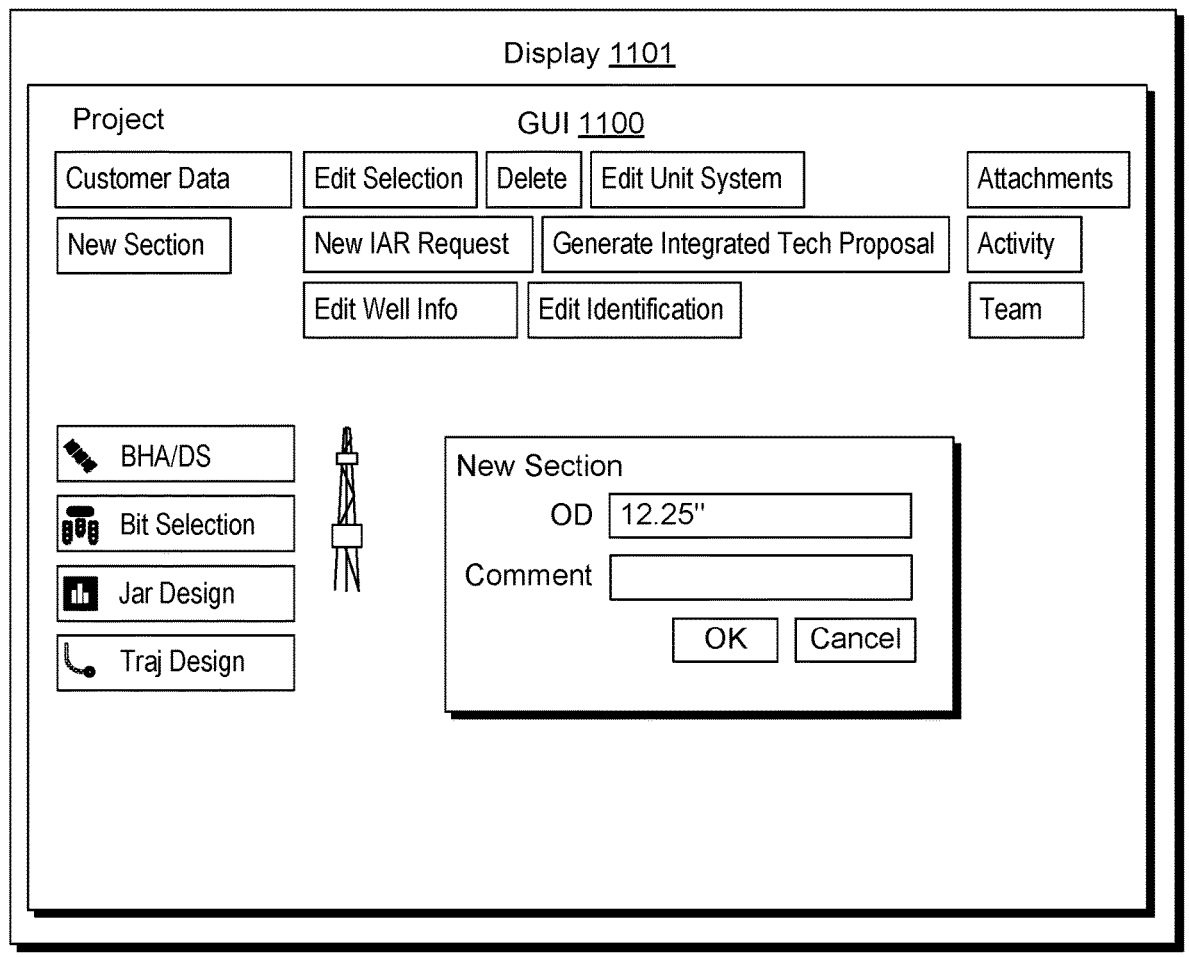
FIG. 11 illustrates an example of a graphical user interface.

FIG. 11 shows an example of a graphical user interface (GUI) 1100 rendered to a display 1101. As shown, the GUI 1100 includes various graphical controls that may be actuated via touch (e.g., on a touchscreen display), a stylus, a pointing device, voice command, etc. The GUI 1100 may be used to input information as to a project, which may be a project associated with a request. For example, consider a request for proposing an oilfield service or services. Such information may be entered and received, for example, by a system that can optionally identify one or more allied services that may be additional to a base service, a requested service, etc.

In the example of FIG. 11, the GUI 1100 includes various design controls (e.g., BHA/Drillstring, Bit Selection, Jar Design, Traj Design), various edit controls, a team control, a customer data control, an activity control, and others. In the example of FIG. 11, the GUI 1100 includes a "Generate Integrated Tech Proposal" control, which can be formulated at least in part based on data entered via such a GUI. In such an example, upon selection of the proposal control, a system may receive an instruction to access information and analyze the information to generate a proposal that includes a service, services, etc. As an example, a generated proposal may include bundled services. As an example, a generated proposal may include services that are members of a hierarchy of service classifications (e.g., bundling classifications, etc.).

As an example, a method can include receiving information associated with a request for proposing an oilfield service; analyzing at least a portion of the information based at least in part on an oilfield services database that includes individual data structures that characterize individual oilfield services; and, based at least in part on the analyzing, outputting at least one oilfield service as a proposed oilfield service.

In such an example, a user may utilize the GUI 1100 to enter information that can be analyzed to propose unrequested services and/or optimize a proposal. As an example, a system may formulate a proposal for a potential customer based on information provided by the potential customer, which, for example, may include or be part of a request for proposal (RFP). For example, an entity may announce to several other entities that it plans to undertake a project where some information about the project is provided. In response, the several entities may generate respective proposals. As an example, where two or more entities are associated (e.g., possibly part of the same parent company), a system may generate a "team" and notify the members of the team that they are working on the same project. As an example, a generated proposal may be generated based on input from a team where team members may be in the same location, different locations, etc.

In the example of FIG. 11, the GUI 1100 includes a "New Section" graphic with a field to enter an outer diameter of a section of a well and a field to add a comment. Such information, upon entry (e.g., clicking OK), may be analyzed by a system to be activity that can be shared with one or more other users (e.g., per a user account basis, user ID basis, etc.). In such an example, the one or more other users may be part of a team working on a common project.

As an example, the GUI 1100 can be utilized at least in part to perform a method that includes receiving information associated with an oilfield service; analyzing at least a portion of the information based at least in part on an oilfield services database that includes individual data structures that characterize individual oilfield services; and, based at least in part on the analyzing, outputting at least one additional oilfield service as a recommended oilfield service. For example, upon selection (e.g., actuation, etc.) of the graphic control labelled "Generate Integrated Tech Proposal", a system may receive an instruction (e.g., a command) to perform the aforementioned analyzing and, for example, the aforementioned outputting. As an example, analyzing may include a gene-based approach to filling in one or more gaps, for example, to bridge one service to another service (e.g., or services to other services, etc.). In such an example, the analyzing may include bundling where services may optionally be bundled with respect to a hierarchy of levels.

Figure 12:
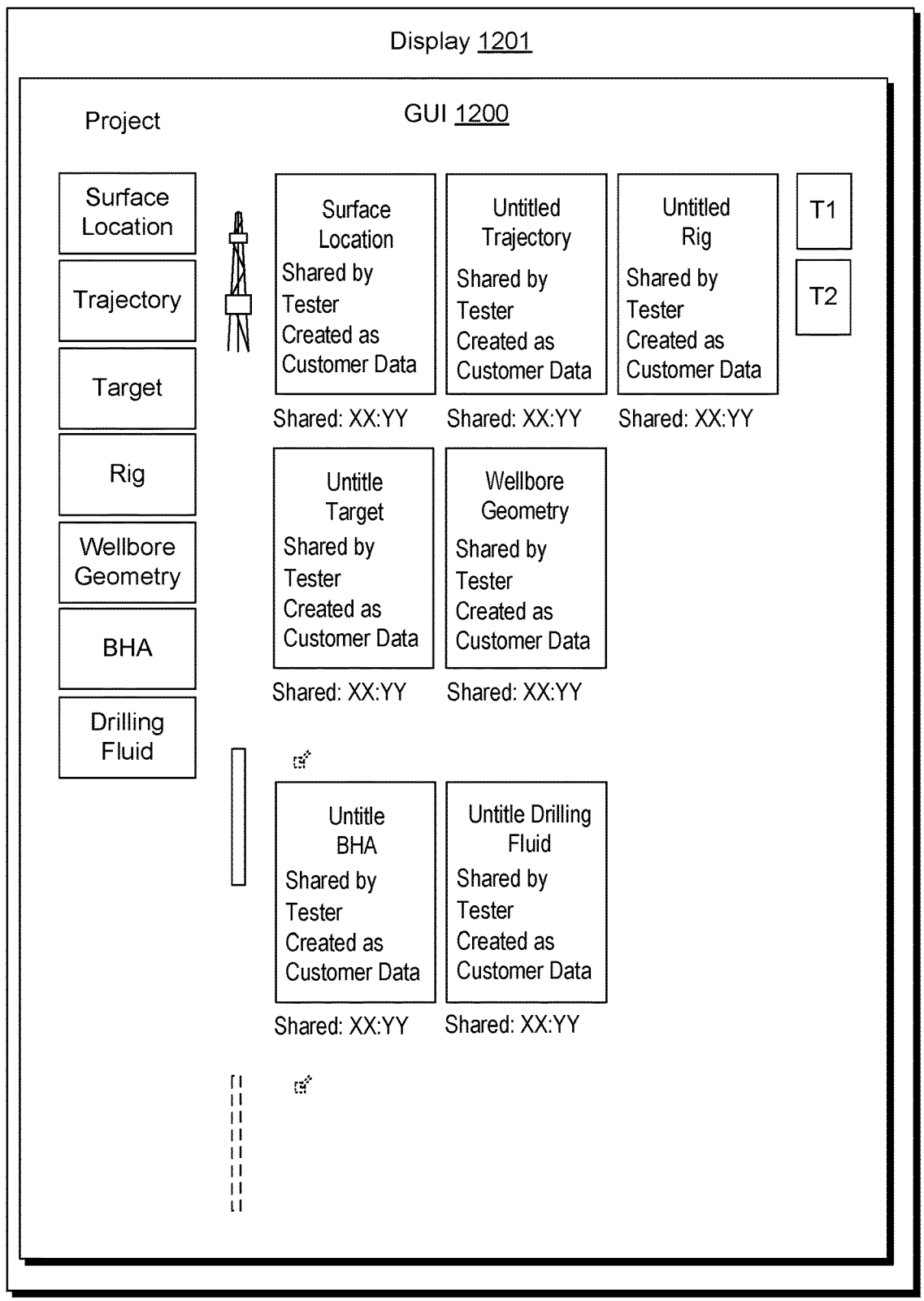
FIG. 12 illustrates an example of a graphical user interface.

FIG. 12 shows an example of a GUI 1200 rendered to a display 1201 where the GUI 1200 includes various graphic controls that may be actuated via touch (e.g., on a touchscreen display), a stylus, a pointing device, voice command, etc. In the example of FIG. 12, the GUI 1200 illustrates, as an example, two team members T1 and T2, which may be online and actively engaged in project development activities via respective user interfaces of computing devices that are operatively coupled to a common processing system. As shown in the example of FIG. 12, the GUI 1200 can indicate sharing of information (e.g., who and at what time). As an example, a tester may be a role that analyzes input information as to suitability for a project, for example, with respect to one or more aspects of a project. As an example, testing may be performed by a system to assure compatibility with components, actions, etc. For example, testing may assure suitability of a specified drilling fluid for a BHA, a trajectory, rig surface equipment, etc. As an example, the information illustrated in the GUI 1200 may be analyzed as part of a method that aims to generate a proposal that includes one or more services. For example, in response to a request for proposal (RFP), a team may utilize such a GUI to design equipment, actions, etc. that can be specified in a proposal.

As an example, a proposal can include bundled services, which may be bundled in a hierarchical manner. As an example, a proposal can include levels of bundles of services. For example, consider a basic level bundle of services, an intermediate level bundle of services and an optimized level bundle of services. Given such levels, a customer may select a desired bundle where assurances are provided that different units of an organization are aware of how services within a bundle are related and can be executed in a manner that is beneficial to the customer.

As an example, a graphical user interface may be rendered to a display, a screen, etc. via execution of instructions by a processor. As an example, a GUI may be a web-based GUI that is generated in part by a browser application that executes on a computing device. As an example, a system may allow for web-based interactions. For example, GUIs may exist for users that input information and one or more GUIs may exist for those that can review output information. In such an example, a GUI may allow for review of one or more bundles of services and, for example, selection of one of the bundles and/or for selection of individual services to generate a new bundle. For example, upon review, a potential customer may select one or more services via a GUI (e.g., akin to a menu of proposed services). Such selection or selections may be received by a system and, for example, communicated to users that utilized the system to generate the proposed services. Thus, an iterative process may be performed by a system to refine a proposal, which can include one or more bundles of services.

As an example, information may be received in one or more forms (e.g., a spreadsheet, a design document, a sketch on napkin, phone call, etc.). As an example, a GUI may allow for entry of information in one or more forms (e.g., upload of drawings, spreadsheets, voice messages, email, etc.).

As an example, a method can include analyzing at least a portion of information with respect to proposing a service additional to and compatible with a requested service. As an example, a proposal for the requested service and the proposal for an additional service or services may be modified to optimize the characteristics of a combined proposal (e.g., of bundled services).

As an example, received information may be associated with requests for multiple services. As an example, a method can include analyzing at least a portion of the information with respect to proposing one or more services additional to and compatible with the requested services. As an example, one or more proposals for a requested service and one or more proposals for one or more additional services may be modified to optimize the characteristics of a combined proposal (e.g., a proposal of bundled services).

As an example, a method can include receiving information associated with an oilfield service; analyzing at least a portion of the information based at least in part on an oilfield services database that includes individual data structures that characterize individual oilfield services; and based at least in part on the analyzing, outputting at least one additional oilfield service as a recommended oilfield service. In such an example, the analyzing can include analyzing at least a portion of the information with respect to a hierarchy of levels where, for example, the hierarchy of levels includes a basic level and an optimized level.

As an example, a method can include receiving information that includes information associated with more than one oilfield service. As an example, information may be received by a computing system via an interface that may be a web interface of a computing device that includes a browser application. In such an example, a graphical user interface may be rendered to a display operatively coupled to the computing device where the GUI includes fields, controls, etc.

As an example, data structures can include service genes that include entries that include corresponding values that characterize services. As an example, one or more algorithms may be executed by a system that operates at least in part on service genes. As an example, such a system may generate for output one or more bundles of services, for example, consider at least two bundles output at corresponding levels of a multilevel hierarchy.

As an example, a method can include analyzing at least a portion of information with respect to historic selection information for oilfield services.

As an example, a method can include rendering a graphical user interface to a display where the graphical user interface includes graphical controls for receipt of at least a portion of the information (e.g., data entry fields, etc.) and where the graphical user interface includes a graphical control that calls for at least the analyzing (e.g., a button, etc.). As an example, such a system may generate output that can be displayed via a GUI, which may be a GUI with features for use by a customer. As an example, a user may review an output GUI prior to making the output GUI available to a customer (e.g., a potential customer, an actual customer, etc.). In such an example, where the output GUI is acceptable, a user may instruct a system to publish the output GUI, for example, to make it available to a customer. For example, consider an email system that can generate an email that includes a link that can be actuated to open a browser application and/or instruct a browser application to access a particular resource where the resource includes information for rendering of the output GUI to a display operatively coupled to a computing device (e.g., consider a computing device of the customer).

As an example, a method can include acquiring information associated with performance of one or more oilfield services. For example, consider acquiring information associated with performance of a selected at least one of at least one additional oilfield services. In such examples, a method can include altering an oilfield services database based at least in part on at least a portion of the acquired information. As an example, an oilfield service may be a drilling service.

As an example, a system can include a processor; memory operatively coupled to the processor; a network interface operatively coupled to the processor; and instructions stored in the memory and executable by the processor to instruct the system to: receive information associated with an oilfield service; analyze at least a portion of the information based at least in part on an oilfield services database that include individual data structures that characterize individual oilfield services; and, based at least in part on an analysis of at least a portion of the information based at least in part on an oilfield services database that includes individual data structures that characterize individual oilfield services, output at least one additional oilfield service as a recommended oilfield service. In such an example, the system can include instructions that can be executed locally and/or remotely to render one or more graphical user interfaces to a display. For example, consider rendering a user interface for input of information, a user interface for output of information, etc.

As an example, data structures can include service genes that include entries that include corresponding values that characterize services.

As an example, a system can include instructions to analyze at least a portion of information with respect to historic selection information for oilfield services.

As an example, a system can include instructions to select at least one of at least one additional oilfield service and, for example, instructions to perform an oilfield service and/or the selected at least one of the at least one additional oilfield service. As an example, a system can include instructions to acquire information associated with performance of an oilfield service and/or a selected at least one of at least one additional oilfield service.

As an example, a system can include instructions to alter an oilfield services database based at least in part on at least a portion of information acquired during performance of at least one oilfield service.

As an example, a system can include a processor; memory operatively coupled to the processor; a network interface operatively coupled to the processor; and instructions stored in the memory and executable by the processor to instruct the system to: receive information associated with an oilfield service (see, e.g., the CRM block 521 of FIG. 5); analyze at least a portion of the information based at least in part on an oilfield services database that includes individual data structures that characterize individual oilfield services (see, e.g., the CRM block 531 of FIG. 5); and, based at least in part on an analysis of at least a portion of the information based at least in part on an oilfield services database that includes individual data structures that characterize individual oilfield services, output at least one additional oilfield service as a recommended oilfield service (see, e.g., the CRM block 541 of FIG. 5).

As an example, one or more computer-readable storage media can include processor-executable instructions executable to instruct a computer to: receive information associated with an oilfield service; analyze at least a portion of the information based at least in part on an oilfield services database that includes individual data structures that characterize individual oilfield services; and, based at least in part on an analysis of at least a portion of the information based at least in part on an oilfield services database that includes individual data structures that characterize individual oilfield services, output at least one additional oilfield service as a recommended oilfield service. In such an example, the data structures can include service genes that include entries that include corresponding values that characterize services.

As an example, instructions can include instructions to analyze at least a portion of information with respect to historic selection information for oilfield services.

As an example, instructions can include instructions to select at least one of the at least one additional oilfield services.

As an example, one or more computer-readable storage media can include instructions to alter an oilfield services database based at least in part on at least a portion of information acquired during performance of at least one oilfield service.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 13:
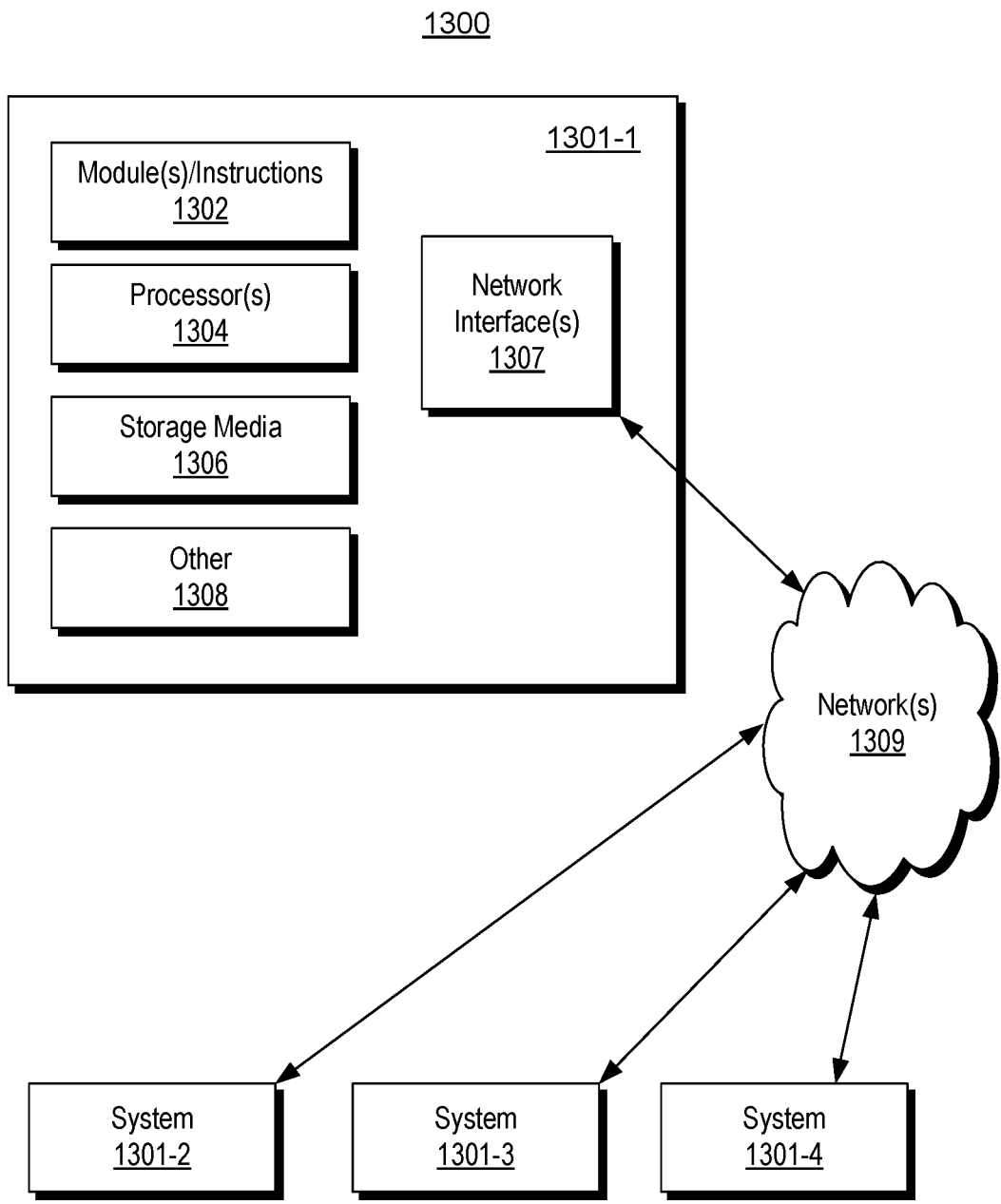
FIG. 13 illustrates an example of a system.

In some embodiments, a method or methods may be executed by a computing system. FIG. 13 shows an example of a system 1300 that can include one or more computing systems 1301-1, 1301-2, 1301-3 and 1301-4, which may be operatively coupled via one or more networks 1309, which may include wired and/or wireless networks.

As an example, a system can include an individual computer system or an arrangement of distributed computer systems. In the example of FIG. 13, the computer system 1301-1 can include one or more modules 1302, which may be or include processor-executable instructions, for example, executable to perform various tasks (e.g., receiving information, requesting information, processing information, simulation, outputting information, etc.).

As an example, a module may be executed independently, or in coordination with, one or more processors 1304, which is (or are) operatively coupled to one or more storage media 1306 (e.g., via wire, wirelessly, etc.). As an example, one or more of the one or more processors 1304 can be operatively coupled to at least one of one or more network interface 1307. In such an example, the computer system 1301-1 can transmit and/or receive information, for example, via the one or more networks 1309 (e.g., consider one or more of the Internet, a private network, a cellular network, a satellite network, etc.).

As an example, the computer system 1301-1 may receive from and/or transmit information to one or more other devices, which may be or include, for example, one or more of the computer systems 1301-2, etc. A device may be located in a physical location that differs from that of the computer system 1301-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1306 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 14:
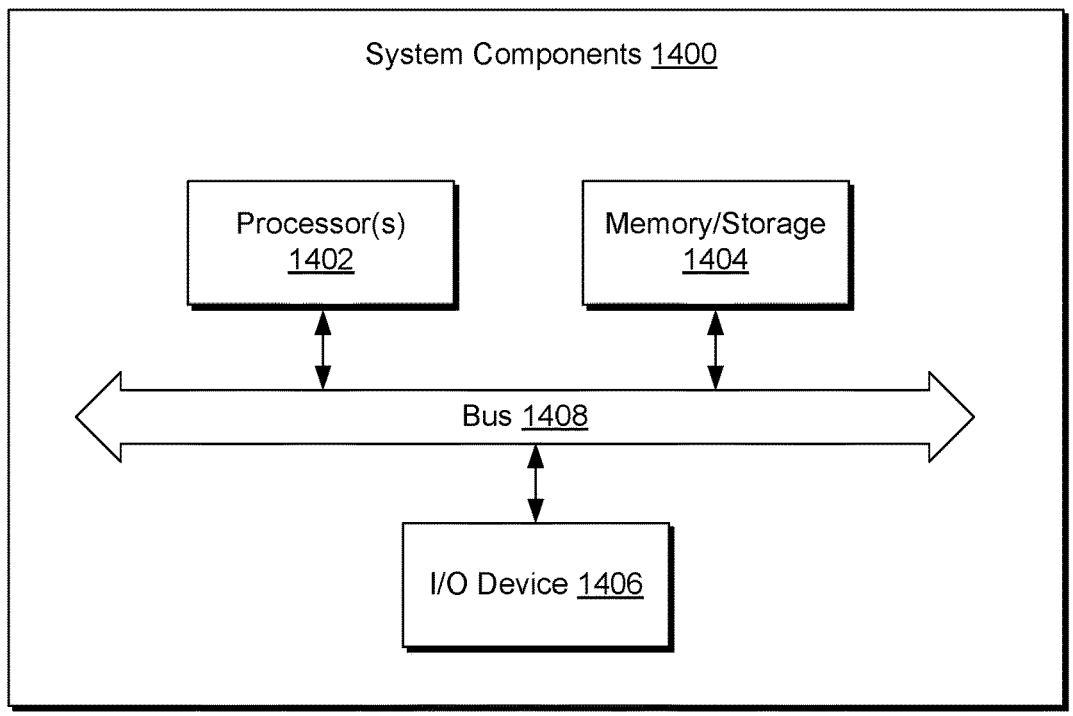
FIG. 14 illustrates example components of a system and a networked system.
Figure 14:
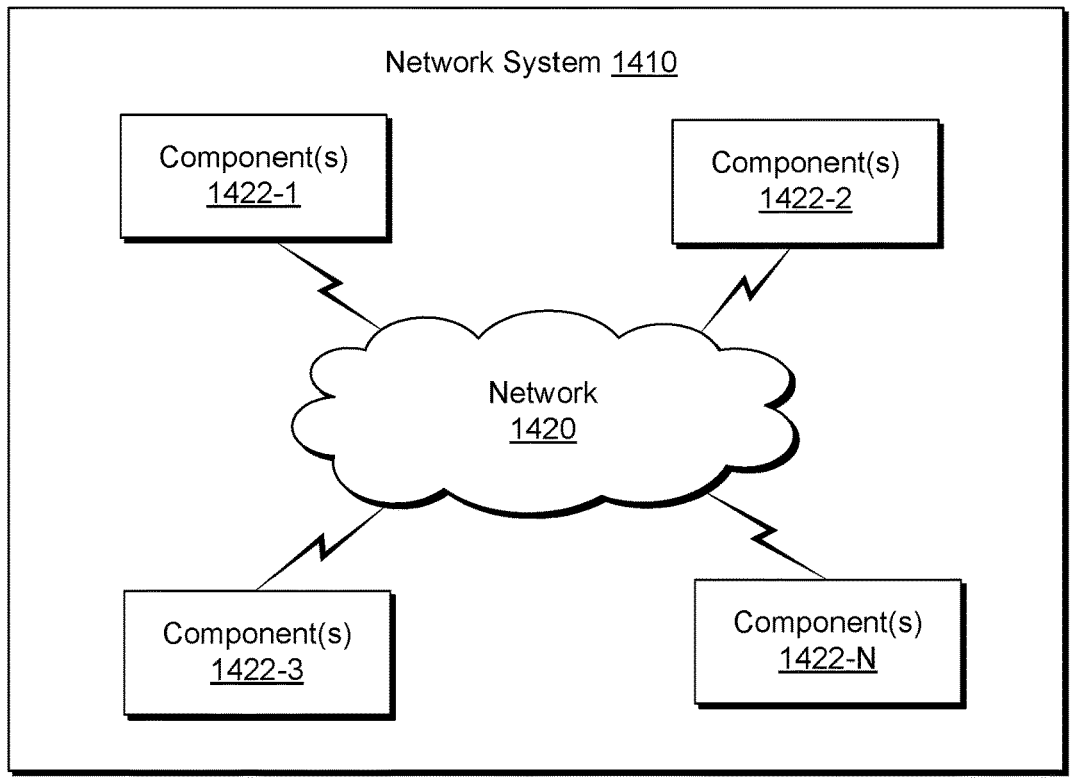

FIG. 14 shows components of a computing system 1400 and a networked system 1410. The system 1400 includes one or more processors 1402, memory and/or storage components 1404, one or more input and/or output devices 1406 and a bus 1408. According to an embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). According to an embodiment, a computer-readable medium may be a storage component such as a physical memory storage device, for example, a chip, a chip on a package, a memory card, etc.

According to an embodiment, components may be distributed, such as in the network system 1410. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s) 1402-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    at a first time, receiving a first set of information from a first source directed to a first network destination, wherein the first set of information comprises data that describe technical characteristics for a first drilling service;
    at a second time, receiving a second set of information from a second source directed to a second network destination, wherein the second set of information comprises data that describe technical characteristics for a second drilling service;
    analyzing, via a computing system, the received first set of information and the second set of information to determine that the first drilling service and the second drilling service are from a common entity and are for a common well;
    calculating, via the computer system, a plurality of drilling service genes, wherein the drilling service genes are data structures that comprise a vector of entries organized according to different types of technical characteristics, wherein the types of technical characteristic s comprise formation characteristics and equipment characteristics;
    responsive to the determination that the first drilling service and the second drilling service are from the common entity and for the common well, searching a database for a third drilling service using at least one of the technical characteristics for the first drilling service and the technical characteristics for the second drilling service, wherein the database comprises a catalog of drilling service genes, and wherein the third drilling service comprises a vector of entries that relate a formation characteristic and an equipment characteristic; and
    at a third time, transmitting a message to a network destination of the common entity, wherein the message recommends the third drilling service and specifies technical characteristics of the third drilling service that define how the third drilling service benefits one or more drilling operations for the common well.

2. The method of claim 1 comprising generating the database.

3. The method of claim 2, wherein generating the database comprises acquiring data from a plurality of drilling operations at a plurality of wells, wherein the plurality of drilling operations correspond to a plurality of drilling services.

4. The method of claim 3, wherein the data indicate technical characteristics of equipment utilized to perform one or more of the plurality of drilling operations.

5. The method of claim 3, wherein the data indicate technical characteristics of well trajectories of one or more of the plurality of wells.

6. The method of claim 1, wherein the database comprises historical information that associates received requests for drilling services with one or more recommended drilling services.

7. The method of claim 1, wherein formation characteristics comprise lithology characteristics.

8. The method of claim 1, wherein the equipment characteristics comprise se nsor characteristics.

9. The method of claim 1, wherein the different types of characteristics comprise trajectory shape characteristics.

10. The method of claim 1, wherein the third drilling service is a top ranked result of the searching.

11. The method of claim 1, wherein the searching filters the catalog of drilling services utilizing the vectors.

12. The method of claim 1, wherein the searching ranks search results from the catalog of drilling services using weights, wherein the weights are based on data indicative of a benefit derived from performance of drilling operations that combined two or more drilling services, and wherein a greater weight represents a greater benefit.

13. The method of claim 1, comprising receiving sensor data acquired during performance of the third drilling service.

14. The method of claim 13, comprising, using the sensor data, determining that the performance of the third drilling service improved drilling of the well, and updating a weight of the database for the third drilling service that links the third drilling service to at least one of the first drilling service and the second drilling service.

15. The method of claim 1, comprising performing the third drilling service, acquiring sensor data during performance of the third drilling service, analyzing at least a portion of the sensor data to generate analysis results, and altering the database based at least in part on the analysis results.

16. The method of claim 1, wherein the first network destination and the second network destination are a common network destination.

17. The method of claim 1, wherein the first network destination and the second network destination differ.

18. A system comprising: a processor;
    memory operatively coupled to the processor; and
    instructions stored in the memory and executable by the processor to instruct the system to: at a first time, receive a first set of information from a first source directed to a first network destination, wherein the first set of information comprises data that describe technical characteristics for a first drilling service;
    at a second time, receive a second set of information from a second source directed to a second network destination, wherein the second set of information comprises data that describe technical characteristics for a second drilling service;
    calculate a plurality of drilling service genes, wherein the drilling service genes are data structures that comprise a vector of entries organized according to different types of technical characteristics, wherein the types of technical characteristics comprise formation characteristics and equipment characteristics;
    analyze the received first set of information and the second set of information to determine that the first drilling service and the second drilling service are from a common entity and are for a common well;
    responsive to the determination that the first drilling service and the second drilling service are from the common entity and for the common well, search a database for a third drilling service using at least one of the technical characteristics for the first drilling service and the technical characteristics for the second drilling service, wherein the database comprises a catalog of drilling service genes, and wherein the third drilling service comprises a vector of entries that relate a formation characteristic and an equipment characteristic; and at a third time, transmit a message to a network destination of the common entity, wherein the message recommends the third drilling service and specifies technical characteristics of the third drilling service that define how the third drilling service benefits one or more drilling operations for the common well.

19. One or more non-transitory computer-readable storage media that comprises processor-executable instructions executable to instruct a computing system to:

at a first time, receive a first set of information from a first source directed to a first network destination, wherein the first set of information comprises data that describe technical characteristics for a first drilling service;

at a second time, receive a second set of information from a second source directed to a second network destination, wherein the second set of information comprises data that describe technical characteristics for a second drilling service;

calculate a plurality of drilling service genes, wherein the drilling service genes are data structures that comprise a vector of entries organized according to different types of technical characteristics, wherein the types of technical characteristics comprise formation characteristics and equipment characteristics;

analyze the received first set of information and the second set of information to determine that the first drilling service and the second drilling service are from a common entity and are for a common well;

responsive to the determination that the first drilling service and the second drilling service are from the common entity and for the common wed, search a database for a third drilling service using at least one of the technical characteristics for the first drilling service and the technical characteristics for the second drilling service, wherein the database comprises a catalog of drilling service genes, and wherein the third drilling service comprises a vector of entries that relate a formation characteristic and an equipment characteristic; and at a third time, transmit a message to a network destination of the common entity, wherein the message recommends the third drilling service and specifies technical characteristics of the third drilling service that define how the third drilling service benefits one or more drilling operations for the common well.

* * * * *